US012368353B2

(12) United States Patent
Bowman et al.

(10) Patent No.: US 12,368,353 B2
(45) Date of Patent: Jul. 22, 2025

(54) METHOD OF MANUFACTURING A STATOR FOR A SLOTLESS ELECTRIC MOTOR

(71) Applicant: ETA GREEN POWER LIMITED, Hethel (GB)

(72) Inventors: Liam Bowman, Hethel (GB); Henry Collings, Hethel (GB)

(73) Assignee: ETA GREEN POWER LIMITED (GB)

( * ) Notice: Subject to any disclaimer, the term of this patent is extended or adjusted under 35 U.S.C. 154(b) by 280 days.

(21) Appl. No.: 18/098,303

(22) Filed: Jan. 18, 2023

(65) Prior Publication Data

US 2023/0231449 A1 Jul. 20, 2023

(30) Foreign Application Priority Data

Jan. 19, 2022 (GB) ...................................... 2200661

(51) Int. Cl.
*H02K 15/02* (2025.01)
*H02K 1/18* (2006.01)
*H02K 3/04* (2006.01)

(52) U.S. Cl.
CPC ............... *H02K 15/02* (2013.01); *H02K 1/18* (2013.01)

(58) Field of Classification Search
CPC .......... H02K 15/02; H02K 1/18; H02K 17/00; H02K 19/00; H02K 3/04

(Continued)

(56) References Cited

U.S. PATENT DOCUMENTS 4,401,907 A * 8/1983 Nozawa .................. H02K 3/04
29/598
5,744,896 A * 4/1998 Kessinger, Jr. .......... H02K 3/04
310/198

(Continued)

FOREIGN PATENT DOCUMENTS

EP 1294076 A2 3/2003
EP 2469690 A1 6/2012

(Continued)

OTHER PUBLICATIONS

Examination Report issued in Appl. No. GB2200661.3 (Jun. 9, 2022).

(Continued)

*Primary Examiner* — Jose A Gonzalez Quinones
(74) *Attorney, Agent, or Firm* — Barnes & Thornburg

(57) ABSTRACT

The present disclosure is directed to slotless electric motor, in particular, to a method of manufacturing a stator for a slotless electric motor. An aspect of the disclosure provides a method of manufacturing a stator for a slotless electric motor, the method comprising: disposing a conductor in the shape of an annular cylinder; bonding a plurality of bonded lengths of the conductor, wherein the plurality of bonded lengths are separated by non-bonded lengths; folding the conductor to provide a plurality of petals repeated along the conductor, wherein each petal comprises a pair of bonded lengths connected by a non-bonded length; rotating each petal about a point on the second circle to align in parallel the bonded lengths of all of the petals to thereby provide a stator comprising a cylindrically-shaped conductor wherein the bonded lengths are equidistantly disposed around and from a central longitudinal axis of the cylindrically-shaped conductor.

11 Claims, 12 Drawing Sheets

(58) Field of Classification Search
USPC .................................. 310/179, 203, 207
See application file for complete search history.

(56) References Cited

U.S. PATENT DOCUMENTS

| | | | |
|---|---|---|---|
| 2017/0353072 A1 | 12/2017 | McSheery | |
| 2018/0115209 A1* | 4/2018 | Li | .................. H02K 15/0431 |
| 2020/0313526 A1 | 10/2020 | Gabrys et al. | |

FOREIGN PATENT DOCUMENTS

| | | | | |
|---|---|---|---|---|
| GB | 2580918 | | 8/2020 | |
| JP | S56103410 A | | 8/1981 | |
| JP | S6032552 A | | 2/1985 | |
| JP | 2006340583 | | 12/2006 | |
| JP | 2019122245 A | * | 7/2019 | ........... H02K 1/2766 |
| WO | 2018/110714 | | 6/2018 | |

OTHER PUBLICATIONS

Search Report issued in Appl. No. GB2200661.3 (Nov. 17, 2022).
European Examination issued in Appl. No. 23 198 664.7, 3 pages.
European Examination issued in Appl. No. 23 152 309.3, 2 pages.
Further Search Report issued in Appl. No. GB2200661.3, dated Sep. 14, 2023, 1 page.
Search Report issued in Appl. No. GB2316417.1, dated Nov. 15, 2023, 1 page.
Search Report issued in Appl. No. GB2314362.1, dated Nov. 15, 2023, 1 page.
Extended European Search Report for Application No. 23152309.3-1202, dated Jun. 14, 2023, 6 pages.

* cited by examiner

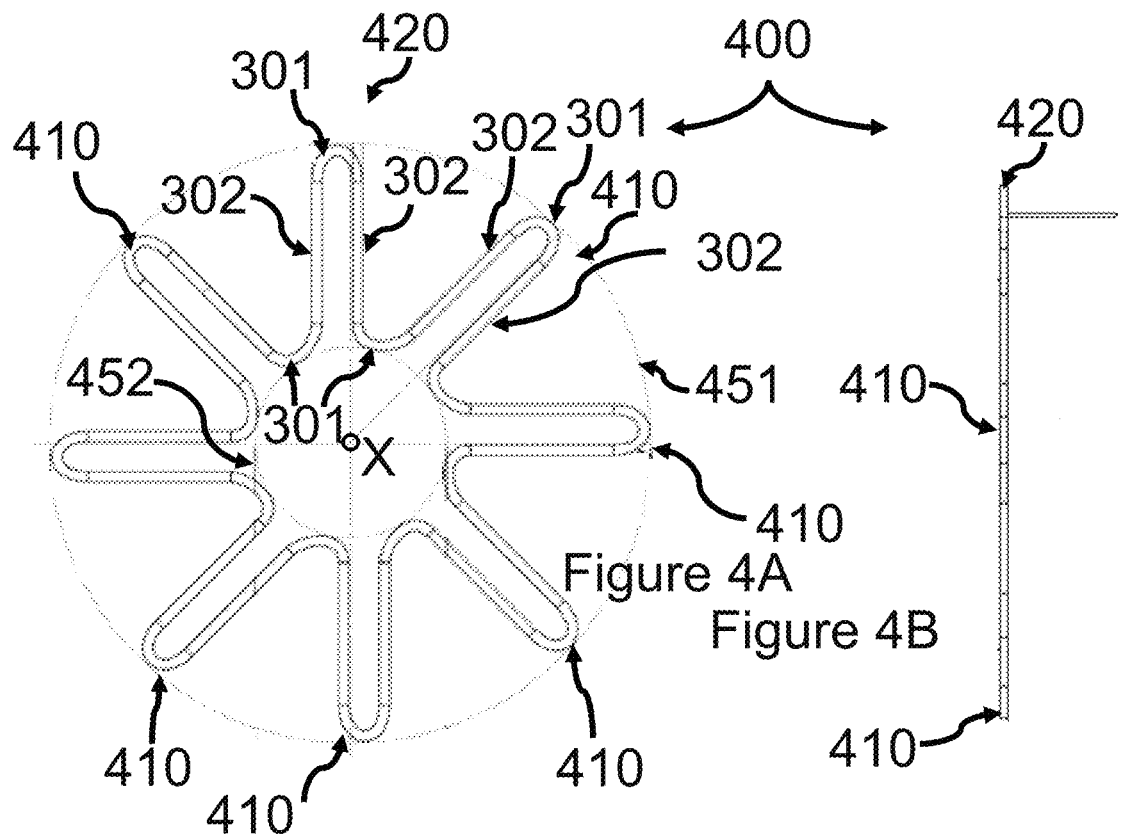
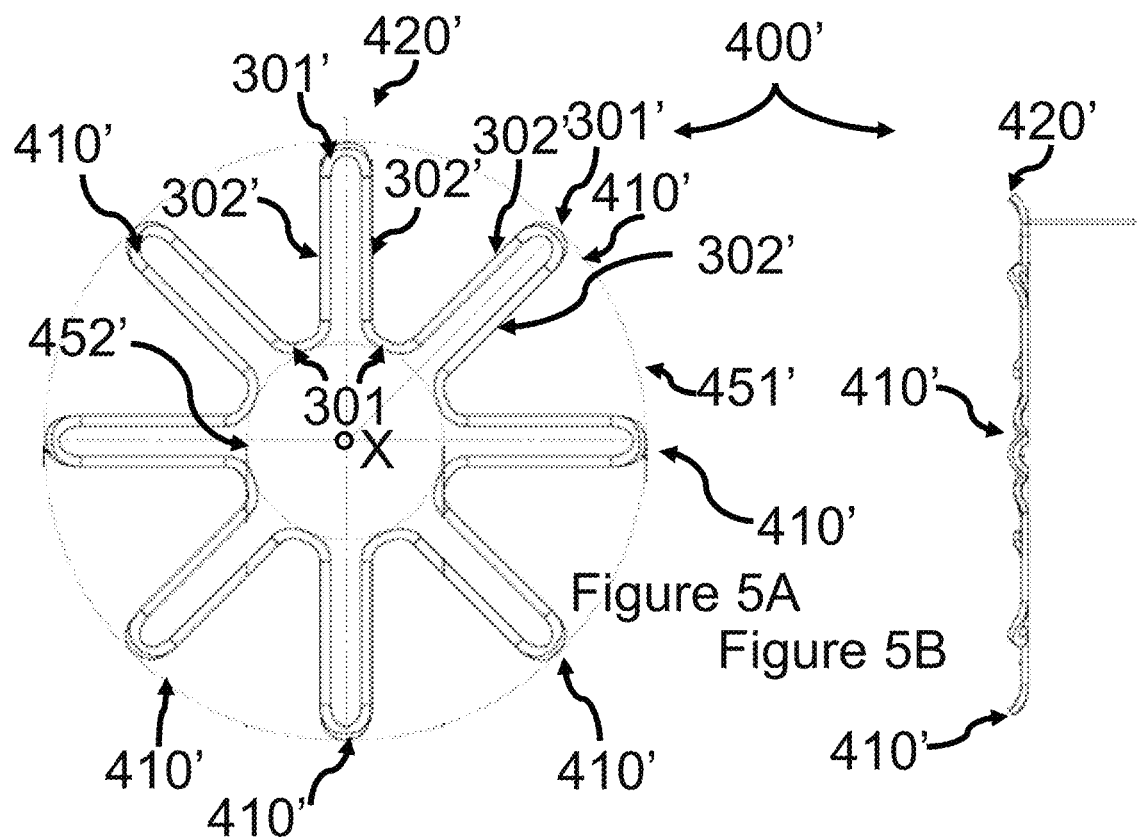

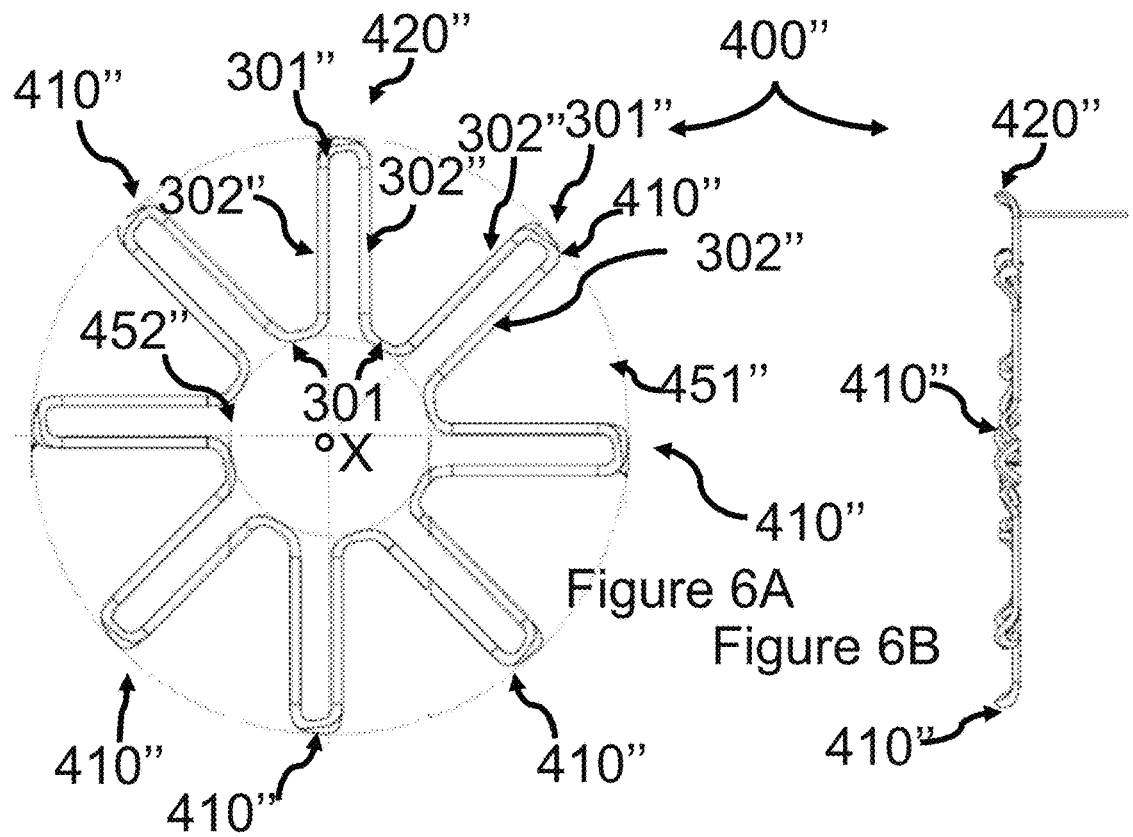
Figure 6A
Figure 6B
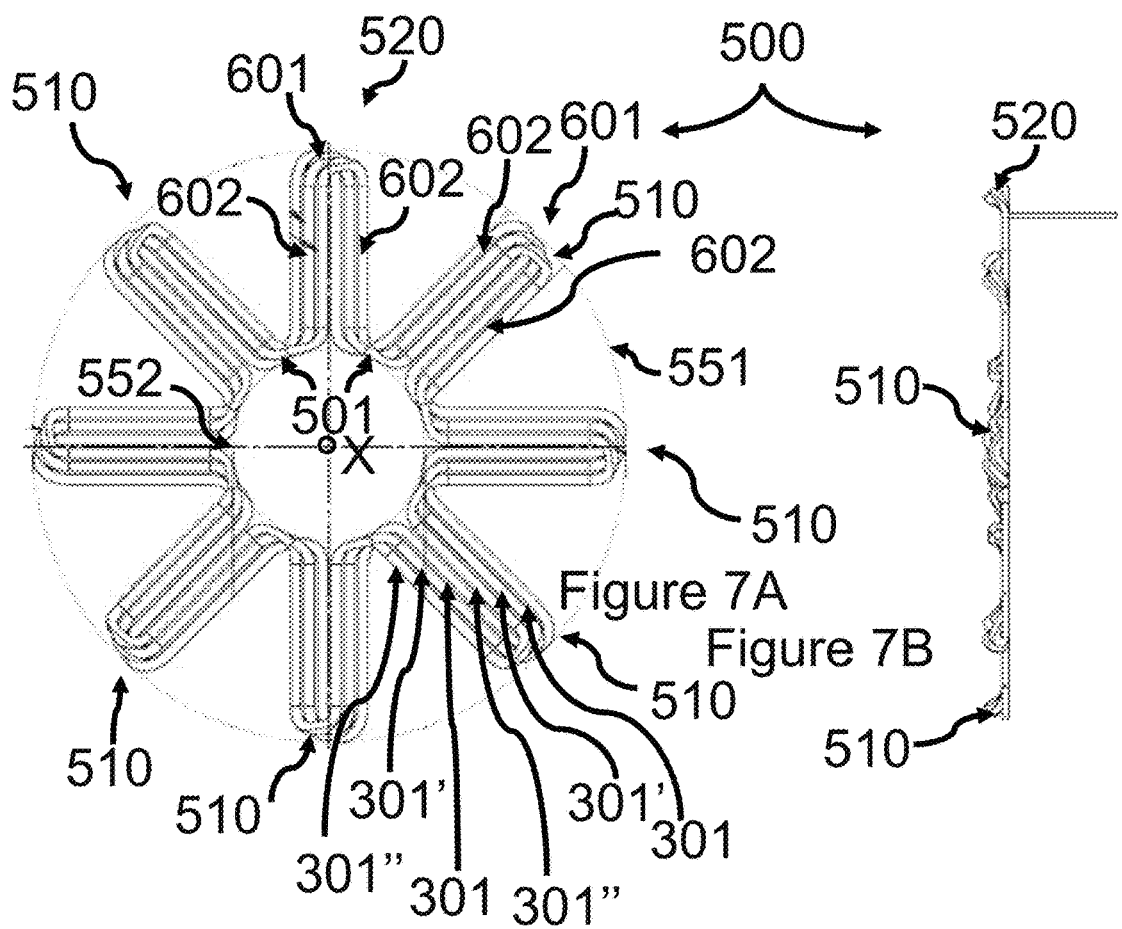
Figure 7A
Figure 7B

METHOD OF MANUFACTURING A STATOR FOR A SLOTLESS ELECTRIC MOTOR

CROSS-REFERENCE TO RELATED APPLICATIONS

This application claims priority from United Kingdom Patent Application No. GB 2200661.3, filed Jan. 19, 2022, the entirety of which is hereby incorporated by reference herein.

FIELD OF INVENTION

The present invention is directed to slotless electric motor, in particular, to a method of manufacturing a stator for a slotless electric motor.

BACKGROUND

A motor is an electromagnetic device that converts electric energy into kinetic energy. The motor comprises two parts: a stator; and a rotor. Slotless motors are a type of motor which are known in the art.

Disadvantageously, prior art methods of manufacturing slotless motors are time consuming and or costly.

Disadvantageously, some typical prior art methods of manufacturing stators for slotless motors require a secondary process to join all of the individual conductor coils together after shaping of the conductor coils. That is, a primary method of forming a conductor into a given shape (e.g. into a given geometry) is performed a plurality of times for a plurality of conductor coils. Once the primary method has been performed a given number of times (e.g. N times) the individual conductor coils (e.g. the N individual conductor coils) are joined together (e.g. via N–1 connections) to provide a stator for a slotless motor.

Disadvantageously, some typical prior art methods of manufacturing stators for slotless motors form stators from a single conductor (e.g. thereby omitting the N–1 connections described in the paragraph above) comprise compressing the conductor into a given shape s (e.g. into a given geometry) to form a plurality of loops which may result in a stator with disorganised (e.g. crossing and/or non-parallel) conductor lengths which form the loops. The disorganisation of the conductor loops result from circulating losses in the windings.

SUMMARY

Aspects of the invention are set out in the independent claims and optional features are set out in the dependent claims. Aspects of the disclosure may be provided in conjunction with each other, and features of one aspect may be applied to other aspects.

An aspect of the disclosure provides a method of manufacturing a stator for a slotless electric motor, the method comprising: disposing a conductor in the shape of an annular cylinder; bonding a plurality of bonded lengths on the conductor wherein the bonded lengths comprise regions of the conductor wherein adjacent wires are bonded along the bonded lengths and wherein the average spacing between adjacent wires is smaller in the bonded lengths than in non-bonded lengths, wherein the plurality of bonded lengths are separated by non-bonded lengths; folding the conductor to provide a plurality of petals repeated along the conductor, wherein each petal comprises a pair of bonded lengths connected by a non-bonded length, wherein the pair of bonded lengths are disposed parallel to each other, and wherein: adjacent petals on the conductor are connected by a non-bonded length; and, the non-bonded lengths in the petals are bounded by a circumference of a first circle, wherein the first circle has a first diameter; the non-bonded lengths which connect the petals are bounded by a circumference of a second circle, wherein the second circle has a second diameter, wherein the second diameter is less than the first diameter, and wherein the first circle and second circle are coplanar and concentric; rotating each petal about a point on the second circle to align in parallel the bonded lengths of all of the petals to thereby provide a stator comprising a cylindrically-shaped conductor having a diameter equal to the second diameter and wherein the bonded lengths are equidistantly disposed around and from a central longitudinal axis of the cylindrically-shaped conductor.

Advantageously, a method of manufacturing a stator for a slotless motor is provided which is less time consuming than prior art manufacturing methods.

The conductor may form at least part of the stator for a motor.

In examples, the method of manufacturing a stator may comprise a step of providing a wave winding. Advantageously, wave windings provide stators with comparatively large conductor volumes with a comparably fewer number of soldering/welding processes to provide the conductor. Advantageously, wave windings provide stators with a reduced circulating/eddy losses.

In examples, the annular cylinder (also referred to as the cylinder) may have an inner radial face and an outer radial face and first axial face and a second axial face and a central longitudinal axis.

In examples, the conductor comprises a bundle of wires. Each wire may be disposed parallel to neighbouring wires (e.g. there are no twists or knots formed between the wires).

In examples wherein the conductor is wound around the central longitudinal axis in the manner of a helix, each of the wires of the conductor has a constant distance from the inner radial face.

In examples wherein the conductor is wound around the central longitudinal axis in the manner of a spiral, each of the wires of the conductor has a constant distance from the first axial face.

The step of bonding a plurality of bonded lengths on the conductor may comprise applying a bonding compound (e.g. an adhesive such as a resin or a wax) to lengths of the conductor to thereby form a plurality of bonded lengths, for example, wherein the step of bonding a plurality of bonded lengths on the conductor further comprises activating the bonding compound (e.g. making the resin or wax set into a solid).

In examples wherein the bonding compound is a wax, the wax may be melted and then applied to the lengths of the conductor. The lengths with the wax applied may be compressed whilst the wax is permitted to cool until it solidifies. In this context 'activating' the wax may comprise cooling the wax so that it solidifies.

In examples, the bonding compound is a wax such as a moulding wax. The moulding wave is applied to the lengths of the conductor which are compressed and subsequently baked during a potting process (i.e. thereby 'activating' the wax).

Advantageously, a simple means of providing a plurality of bonded lengths may be provided e.g. there may be no need for welding etc. Advantageously, the time required to manufacture/assemble e.g. a conductor for each electrical phase may be formed into a cylindrical shape using the manufacturing method a single time rather than performing a method of forming individual conductors into a specific shape multiple times and then joining (e.g. welding) these individual conductors together.

The method may comprise: applying a half-twist to one of the non-bonded lengths of the conductor at a first point on the conductor so that a cross-section of the wire at the first point of the conductor is a mirror-image of a cross-section of the wire at a second point of the conductor, such that, a wire on the inner radial face at the first point is on the outer radial face at the second point.

Advantageously, Joule heating of the conductor can be distributed between a first portion of the conductor on a first side of the half-twist and a second portion of the conductor on a second side of the half-twist. Therefore, wear associated with said heating may be distributed between the two sides thereby extending the lifetime of the conductor.

The method may comprise: disposing the cylindrically-shaped conductor within a central hole of a flux ring having an inner diameter which is greater than the second diameter to thereby provide a stator comprising a cylindrically-shaped conductor with a flux ring disposed around an outer radial surface of the conductor.

The flux ring may have an axial length which is at least the length of the bonded lengths of the conductor. Advantageously, the power transfer from the stator to the rotor may be increased compared to if a shorter flux ring is used.

The method may comprise: disposing an expandable mandrel in the centre of the cylindrically-shaped conductor; and, expanding the expandable mandrel when the cylindrically-shaped conductor is disposed within the central hole of the flux ring to thereby increase the diameter of the cylindrically-shaped conductor to a diameter between the second diameter and the inner diameter of the flux ring.

In examples, a plurality of the folded conductors (e.g. conductors formed by the step of folding the conductor to provide a plurality of petals repeated along the conductor— set out in detail above) are stacked atop one another (e.g. so that the first circles and second circles of each conductor are disposed atop each other and each of the petals are aligned). Subsequent method steps are performed on the plurality of conductors as a whole.

Advantageously, the radial distance between the conductor and the flux ring may be reduced thereby comparatively increasing power transfer between the conductor (e.g. stator) and a rotor. In examples wherein a plurality of the folded conductors are stacked atop one another, the folded conductors are stacked to a selected preferable stack height. The stack height is the axial extent of the stacked conductors. At the preferable stack height an improved copper density is provided which permits high current flow therethrough with comparatively low power losses. Providing a stack of folded conductors close to or at a preferable stack height the radial distance between the conductor and flux ring is reduced.

The method may comprise: bending a first axial end of the cylindrically-shaped conductor to toward the longitudinal axis.

The first axial end may be disposed in contact with a heat sink to thereby aid in heat transfer away from the stator. In examples, the second axial end may be disposed in contact with a heat sink.

Advantageously, the mean axial distance between the flux ring and the first axial end of the conductor may be reduced thereby increasing power transfer between the stator and rotor. Power losses ($I^2R$) are reduced which leads to a lower temperature rise in the conductor when a current is flowed therethrough. Reducing the temperature rise in the conductor permits a greater torque to be applied to the motor (and higher motor speeds obtained).

The method may comprise: bending a second axial end of the cylindrically-shaped conductor away from the longitudinal axis.

Providing at least one of the axial ends away from the longitudinal axis (in this example, the second axial end) a rotor may be inserted into the stator i.e. the rotor may be disposed between an inner radial surface formed by the cylindrically-shaped conductor.

An aspect of the disclosure provides a method of manufacturing stator for a slotless electric motor, the method comprising: disposing a conductor in a penannular shape within the bounds of an annular cylinder bonding a plurality of bonded lengths on the conductor wherein the bonded lengths comprise regions of the conductor wherein the wires in the region have been bonded together, wherein the plurality of bonded lengths are separated by non-bonded lengths; applying a half-twist to one of the non-bonded lengths of the conductor at a first point on the conductor so that a cross-section of the wire at the first point of the conductor is a mirror-image of a cross-section of the wire at a second point of the conductor, such that, a wire on the inner radial face at the first point is on the outer radial face at the second point.

Advantageously, a method of manufacturing a stator for a slotless motor is provided which is less time consuming than prior art manufacturing methods.

In examples, the annular cylinder (also referred to as the cylinder) may have an inner radial face and an outer radial face and first axial face and a second axial face and a central longitudinal axis.

In examples, the conductor comprises a bundle of wires. Each wire may be disposed parallel to neighbouring wires (e.g. there are no twists or knots formed between the wires).

In examples wherein the conductor is wound around the central longitudinal axis in the manner of a helix, each of the wires of the conductor has a constant distance from the inner radial face.

In examples wherein the conductor is wound around the central longitudinal axis in the manner of a spiral, each of the wires of the conductor has a constant distance from the first axial face.

An aspect of the disclosure provides a stator for a slotless electric motor obtainable by any of the methods described herein.

Advantageously, a stator for a slotless motor is provided which is less time consuming to manufacture than slotless motors manufactured by prior art methods.

An aspect of the disclosure provides a method of manufacturing a slotless electric motor, the method comprising: performing any of the methods of manufacturing a stator described herein to thereby provide a stator; and providing a rotor configured to rotate around an axial centre of the stator.

Advantageously, a method of manufacturing a stator for a slotless motor is provided which is less time consuming than prior art manufacturing methods.

An aspect of the disclosure provides a stator for a slotless electric motor, the stator comprising: a conductor comprising a bundle of wires wherein each wire is disposed parallel to the other wires wherein the conductor comprises a plurality of bonded lengths wherein the bonded lengths comprise regions of the conductor wherein adjacent wires are bonded along the bonded lengths and wherein the average spacing between adjacent wires is smaller in the bonded lengths than in non-bonded lengths, wherein the non-bonded lengths separate the plurality of bonded lengths.

The bonded lengths may be referred to as chocolate blocks or choc blocks. Advantageously, the bonded lengths provide regions of increased conductor density in comparison to the conductor density in unbonded lengths. Correspondingly, the bonded regions may permit comparatively higher current density to pass therethrough which may generate magnetic fields of increased strength (e.g closer field lines) around the bonded lengths when compared to unbonded lengths. In examples, wherein the conductor is copper, the bonded lengths provide regions of increased copper density, also known as copper fill or copper fill density.

The bonded lengths have a greater stiffness (e.g. rigidity) in comparison to the unbonded lengths. That is, the bonded lengths deform to a lesser extent than unbonded lengths when forces of equal magnitude are applied to both the bonded length and the unbonded lengths. The bonded lengths may support the structure of the stator (e.g. the stator is self-supporting because of the bonded lengths) given the relative stiffness of the bonded lengths.

The conductor may be disposed in a cylindrical shape, wherein: the bonded lengths of the conductor are arranged parallel to each other and are disposed on the circumference of a circle; and, the bonded lengths are equidistantly disposed around and from a central longitudinal axis of the cylindrically-shaped conductor.

DRAWINGS

Embodiments of the disclosure will now be described, by way of example only, with reference to the accompanying drawings, in which:

FIGS. 4A and 4B illustrate the conductor shown in FIGS. 3A, 3B, and 3C folded to provide a plurality of petals;

FIGS. 5A and 5B illustrate another conductor similar to the first conductor shown in FIGS. 3A, 3B, and 3C folded to provide a plurality of petals;

FIGS. 6A and 6B illustrate another conductor similar to the first conductor shown in FIGS. 3A, 3B, and 3C folded to provide a plurality of petals;

FIG. 7A illustrates an axial perspective view of a first folded conductor, a second folded conductor and a third folded conductor axially stacked one atop the other to provide a folded conductor stack;

FIG. 7B illustrates a radial perspective view of the folded conductor stack shown in FIG. 7A;

Figure 10A:
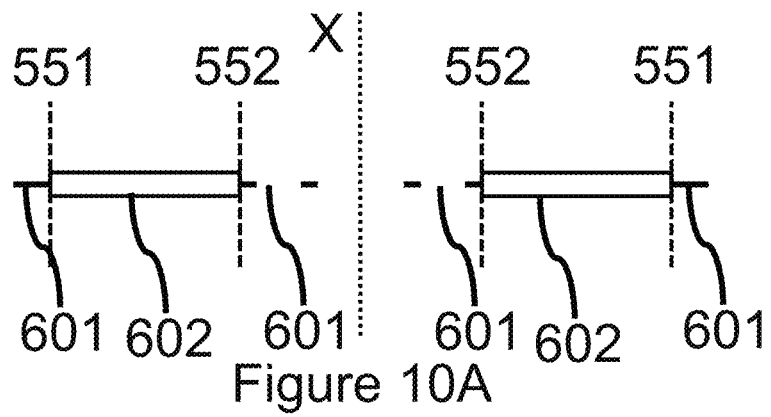
Figure 10B:
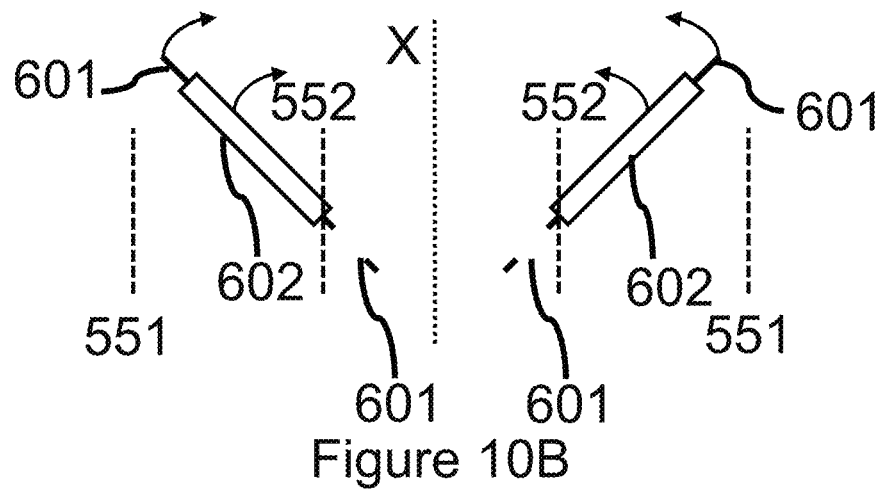
Figure 10C:
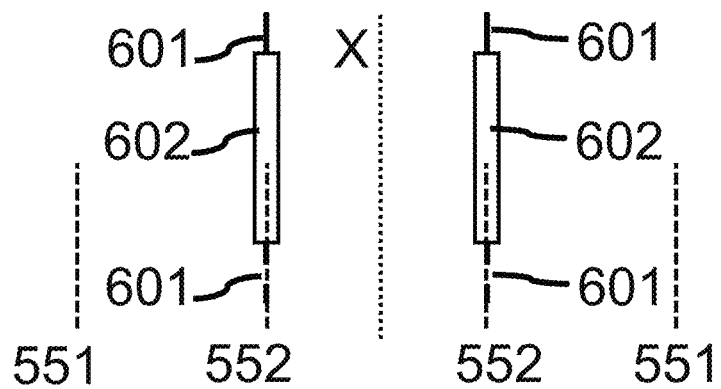
Figure 11:
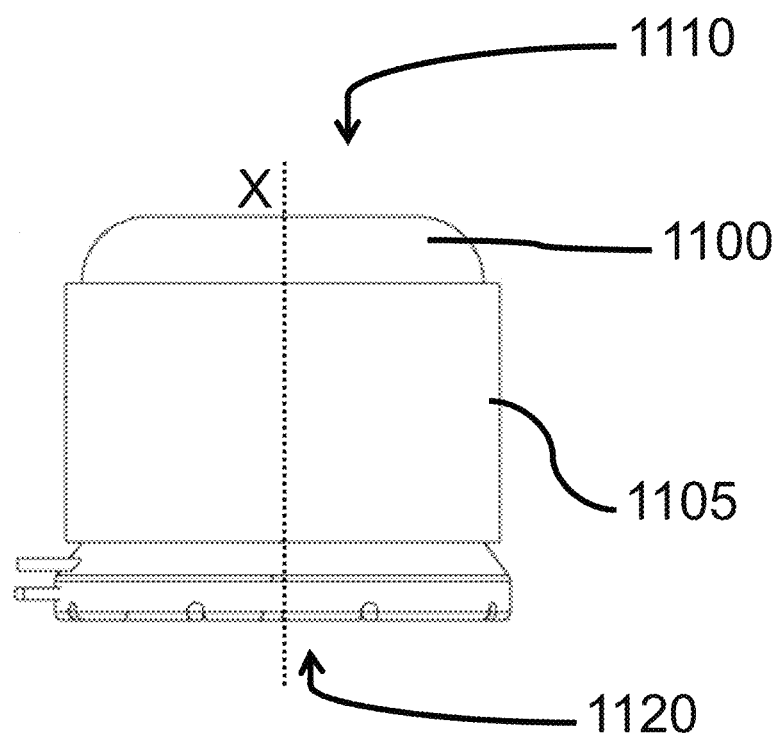
Figure 12:
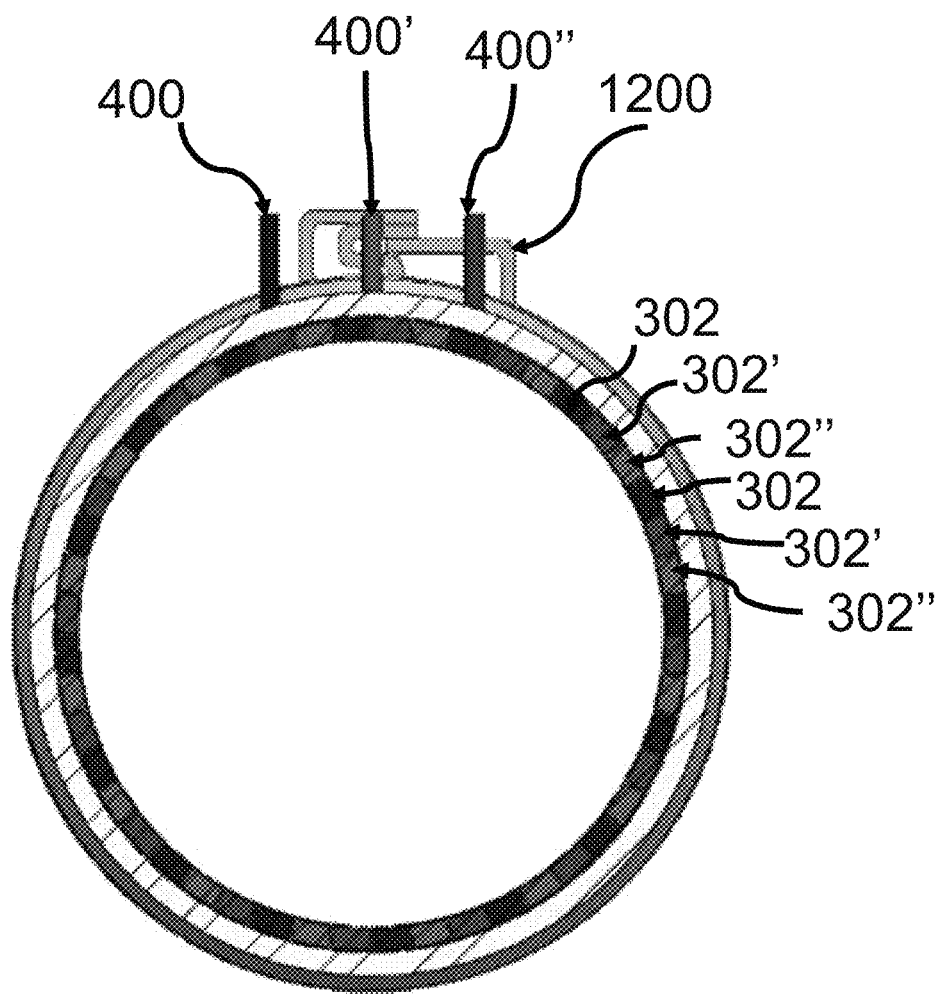
Figure 13:
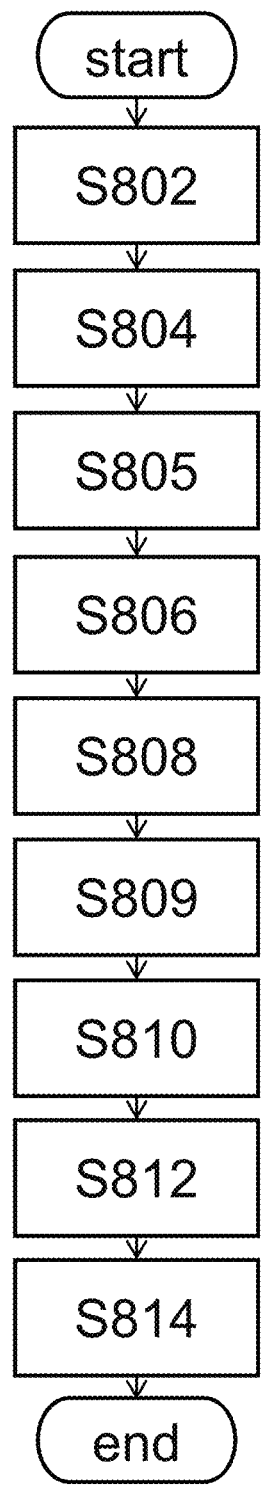

FIGS. 10A, 10B, and 10C illustrate a sequence of steps to rotate the set of petals of the folded conductor shown in FIG. 7A to form the stator core illustrated in FIG. 11;

FIG. 11 illustrates a cylindrically-shaped conductor formed from the stack of conductors shown in FIGS. 7A and 7B;

FIG. 12 illustrates an axial perspective view of a cylindrically-shaped conductor for a stator;

FIG. 13 illustrates a flowchart depicting a method of manufacturing a stator for a slotless electric motor.

In the drawings, like reference signs indicate like elements.

DESCRIPTION

Herein a method of manufacturing a stator for a slotless motor is described. The stator may be a radial flux stator, but it will be understood that other examples of stator may be used. In short, a conductor comprising wires is provided which will form the basis of the stator. Portions of the conductor are bonded to provide a plurality of bonded lengths which act as stator coils in the assembled stator. The conductor is manipulated in a novel and inventive manner to provide a conductor wherein all of the wires have the same circumferential average position and the same radial average position of the wires are all equal to thereby provide a stator.

FIG. 1A illustrates a plan view of a conductor 100. FIG. 1B illustrates a plan view of a portion of the conductor 100.

The conductor 100 comprises a bundle of wires (e.g. a plurality of wires) wherein each wire is disposed parallel to the other wires.

A method of manufacturing a stator for a slotless electric motor comprises a step of disposing a conductor in the shape of an annular cylinder, the annular cylinder having an inner radial face and an outer radial face and first axial face and a second axial face, and wherein the conductor comprises a bundle of wires wherein: each wire is disposed parallel to the other wires and, each wire is disposed a constant distance from the inner radial face.

Figure 1:
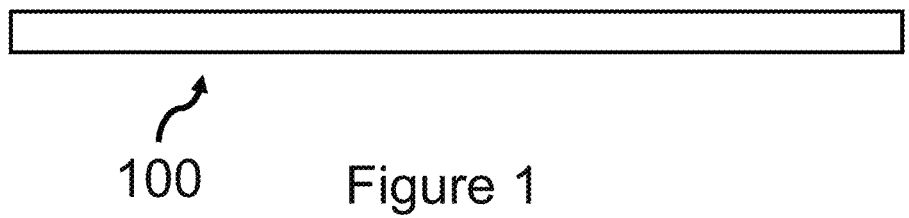
FIG. 1 illustrates a plan view of a conductor.
Figure 2A:
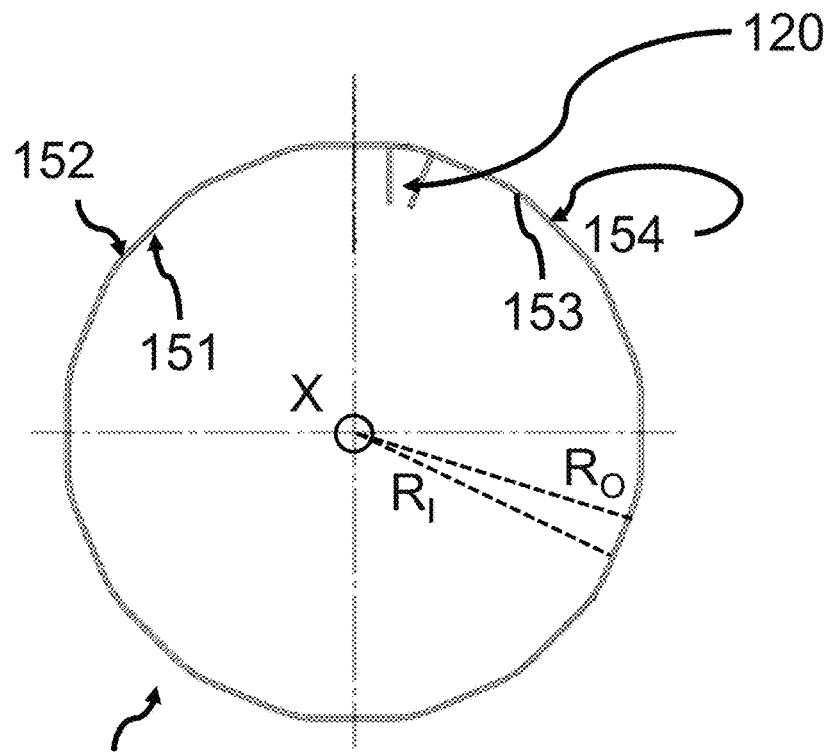
FIG. 2A illustrates an axial plan view of a conductor.
Figure 2B:
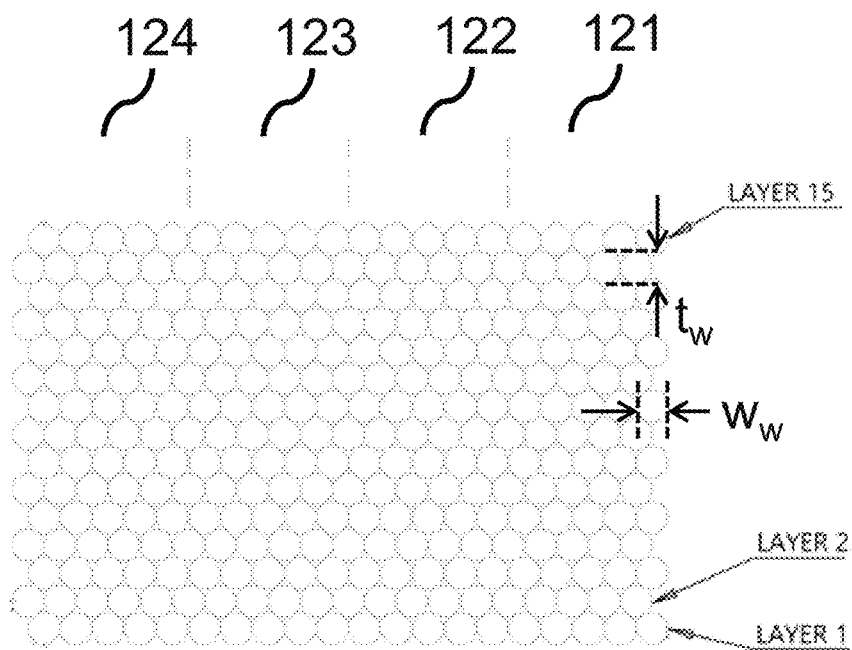
FIG. 2B illustrates a partial axial plan view of a portion of the conductor of FIG. 2A.

FIG. 2A and FIG. 2B illustrate the conductor shown in FIG. 1 disposed into the shape of an annular cylinder as recited in the above method step.

FIG. 2A illustrates an axial plan view of a conductor. FIG. 2B illustrates a partial axial plan view of a portion of the conductor of FIG. 2A.

The conductor 100 is formed in the shape of an annular cylinder surrounding a central longitudinal axis X i.e. the conductor 100 is wrapped around the central longitudinal axis in a helical manner to thereby give the overall form of an annular cylinder. The conductor 100 comprises a plurality of loops around the central longitudinal axis). In the present example, there are four loops i.e. the conductor makes four complete turns around the central longitudinal axis X. The four loops are: a first loop 121; a second loop 122; a third loop 123; a fourth loop 124. The plurality of loops 121 to 124 are disposed parallel and adjacent to one another. When the conductor 100 is wrapped around the central longitudinal axis the wires forming the conductor have a helical shape i.e. the wires comprise a plurality of turns around the central longitudinal axis. Each wire of the conductor is disposed a constant distance from the first axial face; and, each wire is disposed a constant distance from the inner radial face. The conductor 100 has two ends which provide a connection 120 for connecting the conductor to a source of electromotive force.

As stated above the conductor 100 is disposed in the shape of an annular cylinder. The annular cylinder has: a central longitudinal axis X; an inner radial face 151 having an inner radius $R_I$ (i.e. the distance from the central longitudinal axis to the inner radial face 151; an outer radial face 152 having an outer radius $R_O$, a first axial face 153; and, a second axial face 154.

The inner radial face 151 is disposed adjacent to the first axial face 153 and the second axial face 154. The outer radial face 152 is disposed adjacent to the first axial face 153 and the second axial face 154. The first axial face 153 is disposed adjacent to the inner radial face 151 and the outer radial face 152. The second axial face 154 is disposed adjacent to the inner radial face 151 and the outer radial face 152. The first axial face 153 is perpendicular to the inner radial face 151 and the outer radial face 152 and parallel to the second axial face 154. The first axial face 153 and the second axial face 154 are disposed in the direction of the longitudinal axis X. The inner radial face 151 is perpendicular to the first axial face 153 and the second axial face 154. The inner radial face 151 and the outer radial face 152 are disposed perpendicular to the longitudinal axis X.

Although the conductor 100 is continuous, each loop (i.e. complete turn of the conductor around the central longitudinal axis) can be thought of as a discrete integer. A first end of the first loop 121 is configured to connect to a source of electromotive force (EMF). A second end of the first loop 121 is connected to the first end of the second loop 122. A second end of the second loop 122 is connected to the first end of the third loop 123. A second end of the third loop 123 is connected to the first end of the fourth loop 124. A second end of the fourth loop 124 is configured to connect to a source of EMF.

In more detail and as can be seen in FIG. 2B: the first loop 121 is disposed parallel and adjacent to the second loop 122; the second loop 122 is disposed parallel to and between the first loop 121 and the third loop 123; the third loop 123 is disposed parallel to and between the second loop 122 and the fourth loop 124; the fourth loop 124 is disposed parallel to and adjacent to the third loop 123. The connection 120 comprises the first end of the first loop and the second end of the fourth loop.

Circulating currents may be provided around the stator to reduce voltage and/or current asymmetries between any of the loops 121 to 124.

In the present example the conductor 100 comprises fifteen layers of wires. Therefore, the conductor has a thickness of $15t_w$ where $t_w$ is the thickness of one wire. Accordingly, each of the loops has a thickness of $15t_w$. Each layer has a width of five wires. Therefore, the conductor has a width of $5w_w$ where $w_w$ is the width of one wire. It follows that each loop has a thickness $15t_w$ and a width $5w_w$.

In the example described herein, each wire has a circular cross-section (e.g. each wire is a cylindrical tube) and each wire has the same diameter and the thickness and width are equal to the diameter of the circular cross-section; $t_w = w_w$.

The first layer of wires in the conductor (LAYER 1 in FIG. 2B) is disposed at the inner radial face 151 i.e. the first layer is disposed at a separation of zero from the inner radial face. The second layer (LAYER 2 in FIG. 2B) is separated from the inner radial face 151 by one layer (i.e. the first layer i.e. LAYER 1). In other words, the second layer is disposed at a distance equal to the thickness of one wire, $t_w$, from the inner radial face 151. Similarly, the third layer (LAYER 3 in FIGS. 3B to 3C) is disposed at a distance of $2t_w$ from the inner radial face 151 and so on. The fifteenth layer (LAYER 15 in FIG. 2B) is separated from the inner radial face 151 by fourteen layers of wire. In other words, the fifteen layer is disposed at a distance equal to the thickness of fourteen wires, $14t_w$, from the inner radial face 151. The fifteenth layer is disposed at the outer radial face 152 i.e. the fifteenth layer is disposed at a separation of zero from the outer radial face 152.

Each of the loops 121 to 124 spans from the inner radial face 151 to the outer radial face 152. A face of the first loop 121 is disposed at the first axial face 153 i.e. the loop 121 forms the first axial face 153. A face of the fourth loop 124 is disposed at the second axial face 154 i.e. loop 124 forms the second axial face 154.

A method of manufacturing a stator for a slotless electric motor comprises a step of bonding a plurality of bonded lengths on the conductor wherein the bonded lengths comprise regions of the conductor wherein adjacent wires are bonded along the bonded lengths and wherein the average spacing between adjacent wires is smaller in the bonded lengths than in non-bonded lengths, wherein the plurality of bonded lengths are separated by non-bonded lengths.

Figure 3A:
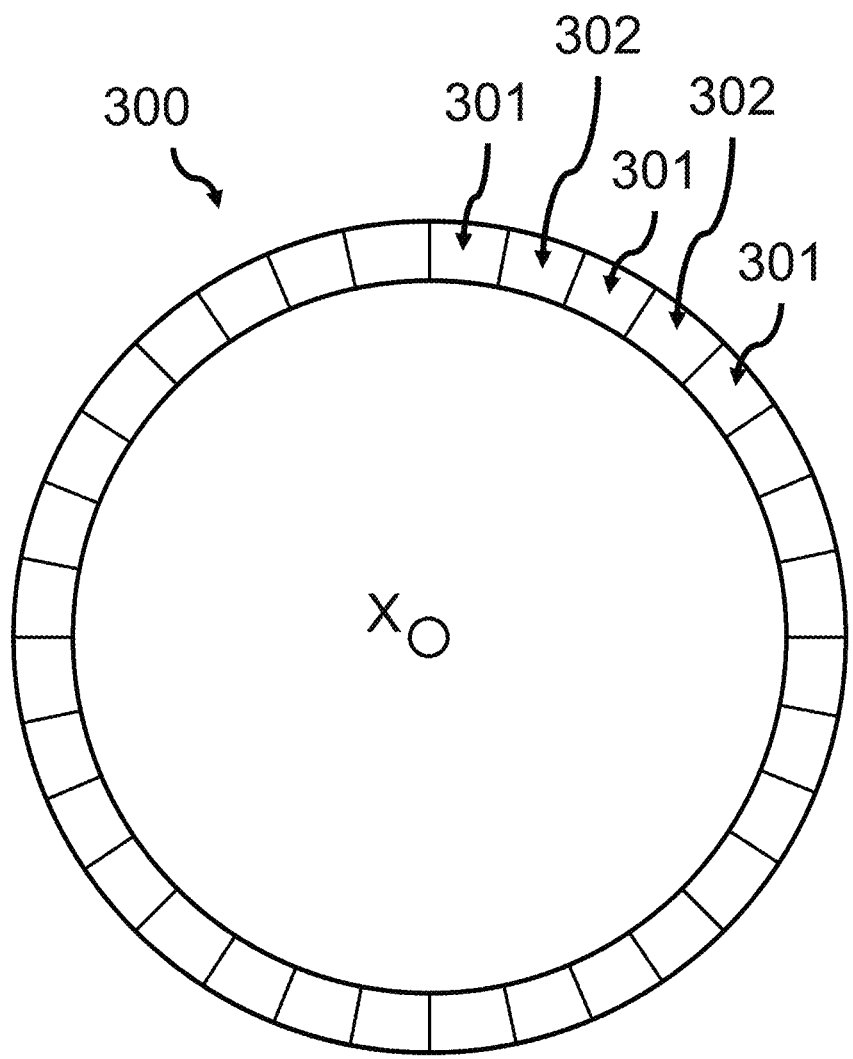
FIG. 3A illustrates an axial plan view of a plan of the conductor of FIGS. 2A and 2B comprising a plurality of bonded and non-bonded lengths.

FIG. 3A illustrate the conductor shown in FIGS. 2A and 2B with a plurality of bonded lengths and a plurality of non-bonded lengths as recited in the above method step.

Figure 3B:
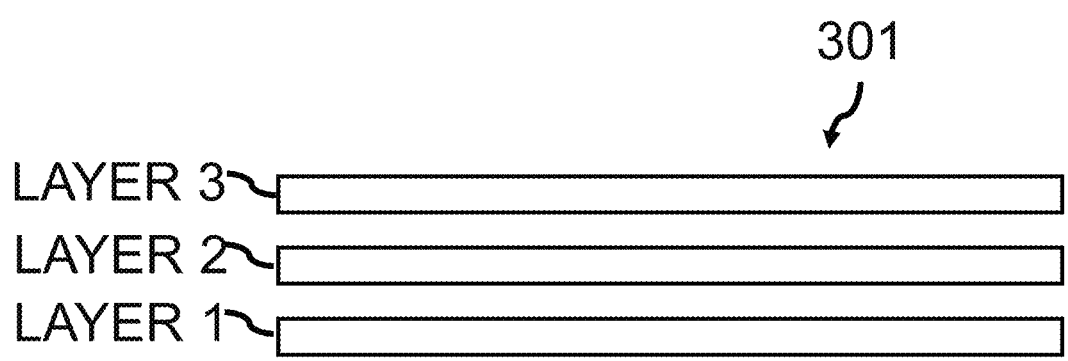
FIG. 3B illustrates an axial plan view of layers of the conductor in a non-bonded length.
Figure 3C:
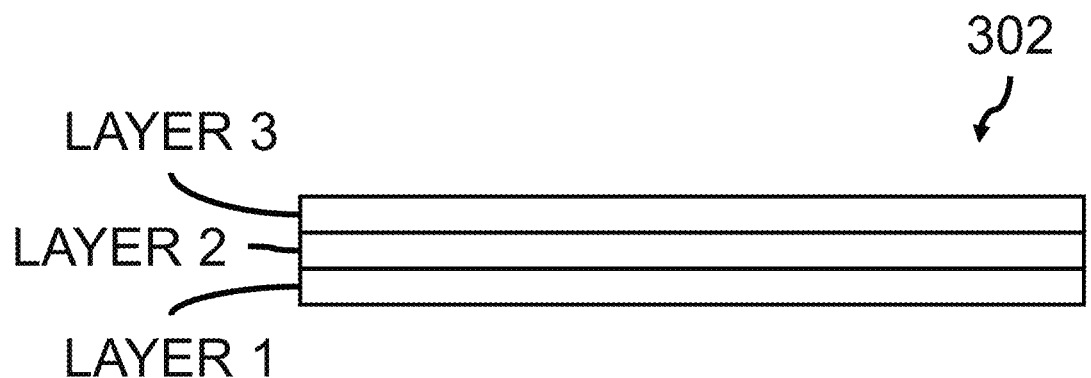
FIG. 3C illustrates an axial plan view of layers of the conductor in a bonded length.

FIG. 3A illustrates an axial plan view of a plan of the conductor of FIGS. 2A and 2B comprising a plurality of bonded and non-bonded lengths; FIG. 3B illustrates an axial plan view of layers of the conductor in a non-bonded length; FIG. 3C illustrates an axial plan view of layers of the conductor in a bonded length.

The cylindrical conductor 100 comprises a plurality of non-bonded lengths 301 and a plurality of bonded lengths 302. The average spacing between wires in adjacent layers is smaller in the bonded lengths 302 than in non-bonded lengths 301. In other words, the bonded lengths 302 have a greater density than the non-bonded lengths 301. The conductor density of the bonded lengths 302 is greater than the conductor density of the non-bonded lengths 301. In examples wherein the conductor is formed of copper, the bonded lengths 301 have a greater copper fill than the non-bonded lengths.

The non-bonded lengths 301 may have a shorter length than the bonded lengths 302.

The bonded lengths 302 are provided by applying a bonding compound to lengths of the conductor 100 and compressing the length where the bonding compound is applied until the bonding compound sets.

In examples, the bonding compound is an adhesive such as a resin, for example a heat-activated resin or a light-activated resin (e.g. a UV-activated resin). In examples wherein a heat-activated resin is provided heat may be provided by a clamping apparatus for compressing the length where the adhesive is applied and heat may be provided by any of: passing a current through the conductor to thereby heat the length of the conductor where the adhesive is applied (e.g. Joule heating); heating the clamping apparatus to thereby heat the length of the conductor where the adhesive is applied; and, irradiating the length of the conductor where the adhesive is applied with infrared light.

A method of manufacturing a stator for a slotless electric motor comprises a step of folding the conductor to provide a plurality of petals repeated along the conductor, wherein each petal comprises a pair of bonded lengths connected by a non-bonded length, wherein the pair of bonded lengths are disposed parallel to each other, and wherein: adjacent petals on the conductor are connected by a non-bonded length; and, the non-bonded lengths in the petals are bounded by a circumference of a first circle, wherein the first circle has a first diameter, the non-bonded lengths which connect the petals are bounded by a circumference of a second circle, wherein the second circle has a second diameter, wherein the second diameter is less than the first diameter, and wherein the first circle and second circle are coplanar and concentric.

FIGS. 4A and 4B illustrate the conductor (i.e. the first conductor) shown in FIGS. 3A, 3B, and 3C folded to provide a plurality of petals as recited in the above method step.

FIGS. 5A and 5B illustrate another conductor (i.e. a second conductor) similar to the first conductor shown in FIGS. 3A, 3B, and 3C folded to provide a plurality of petals as recited in the above method step. FIGS. 6A and 6B illustrate another conductor (i.e. a third conductor) similar to the first conductor shown in FIGS. 3A, 3B, and 3C folded to provide a plurality of petals as recited in the above method step.

FIG. 4A illustrates an axial perspective view of a folded conductor 400 comprising a plurality of petals 410 and connection petal 420; FIG. 4B illustrates a radial perspective view of the folded conductor 400 shown in FIG. 4A. FIG. 5A illustrates an axial perspective view of a folded conductor 400' comprising a plurality of petals 410' and connection petal 420'; FIG. 5B illustrates a radial perspective view of the folded conductor 400' shown in FIG. 5A. FIG. 6A illustrates an axial perspective view of a folded conductor 400" comprising a plurality of petals 410" and connection petal 420"; FIG. 4B illustrates a radial perspective view of the folded conductor 400" shown in FIG. 4A. Neighbouring petals form a 45 degree angle with the central longitudinal axis (i.e. ∠petal-axis-petal=45°)

Each petal 410 comprises a pair of bonded lengths 302 connected by a non-bonded length 301. The pair of bonded lengths in a petal 410 are disposed parallel to each other. Adjacent petals 410 of the conductor are connected by a non-bonded length 301.

The connection petal 420 is similar to the petals 410 but additionally comprises the connection 120.

The non-bonded lengths 301 in the petals 410 and 420 are bounded by a circumference of a first circle 451, wherein the first circle 451 has a first diameter i.e. the non-bonded lengths 301 in the petals are disposed outside of the circumference of the first circle 451.

The non-bonded lengths which connect adjacent petals are bounded by a circumference of a second circle 452, wherein the second circle 452 has a second diameter, wherein the second diameter is less than the first diameter i.e. the non-bonded lengths which connect the petals are disposed within the circumference of the second circle 452.

The first circle 452 and second circle 452 are coplanar and concentric. The first circle 451 and the second circle 452 are disposed in the same plane, referred to herein as the circle plane. The first circle 451 and the second circle 452 are centred on the central longitudinal axis X of the conductor 100.

The second folded conductor shown in FIGS. 5A and 5B has the same features as the first folded conductor which are denoted using the same reference signs each with the addition of a single prime symbol i.e. the second folded conductor has a plurality of petals 410' and a connection petal 420' et cetera. In a similar fashion the third folded conductor has the same features as the first folded conductor which are denoted using the same reference signs each with the addition of a double prime symbol i.e. the third folded conductor has a plurality of petals 410" and a connection petal 420" et cetera.

The first circle 451 and the second circle 452 of the first conductor 400 are identical to the first circle 451' and the second circle 452' of the second conductor 400'. The first circle 451 and the second circle 452 of the first conductor 400 are identical to the first circle 451" and the second circle 452" of the third conductor 400".

FIG. 7A illustrates an axial perspective view of the first folded conductor 400, the second folded conductor 400', and the third folded conductor 400" axially stacked one atop the other to provide a folded conductor stack 500; FIG. 7B illustrates a radial perspective view of the folded conductor stack 500 shown in FIG. 7A.

Once the first conductor 400', the second conductor 400' and the third conductor 400" are folded to provide the petals in the manner described herein, the three conductors are then stacked one atop the other i.e. an axial face of the first conductor 400 is abutted with an axial face of the second conductor 400' and another axial face of the second conductor 400' is abutted with an axial face of the third conductor. The central longitudinal axes of the first, second, and third conductors are aligned and coincident.

The method of forming the stator may comprising axially stacking a plurality of folded conductors 500 (e.g. preferably three) one atop the other.

Hereinafter: a set of petals comprising a petal from the first folded conductor 400, a petal from the second folded conductor 400', a petal from the third folded conductor 400" is referred to as a set of petals 510. Each set of petals 510 comprises two sets of bonded lengths 602 and a set of non-bonded lengths 601. Each set of petals 510 is connected by a set of non-bonded lengths. The set of petals comprising the connection petals of the first, second and third conductors is referred to as a set of connection petals 520. Each set of non-bonded lengths 601 in each set of petals 510 is disposed on the first circle 551 (the first circle 551 is identical to the first circles 451, 451' and 451"). Each set of non-bonded lengths 601 connecting each set of petals 510 is disposed on the second circle 552 (the second circle 552 is identical to the second circles 452, 452' and 452").

The first, second and third conductors are folded so that the bonded lengths in each petal are offset relative to each other. The result of the offset is that the bonded lengths of the conductors are interleaved when axially stacked. This interleaving can be seen in FIG. 7A. A given set of petals, when moving in a clockwise direction about the central longitudinal axis X, has bonded lengths in the order: bonded length 301 from first folded conductor 400; bonded length 301' from second folded conductor 400'; bonded length 301" from third folded conductor 400"; bonded length 301 from first folded conductor 400; bonded length 301' from second folded conductor 400'; bonded length 301" from third folded conductor 400".

FIG. 12 illustrates an axial perspective view of a cylindrically-shaped conductor for a stator. When the stack of folded conductors 500 is formed into a cylindrically-shaped conductor for a stator, the bonded lengths of the various folded conductors remain interleaved as shown.

For each conductor one of the non-bonded lengths may comprise a half-twist. In examples, more than one of the non-bonded lengths may comprises a half-twist e.g. all of the non-bonded lengths may comprise a half-twist or every other one of the non-bonded lengths may comprise a half-twist.

Figure 8A:
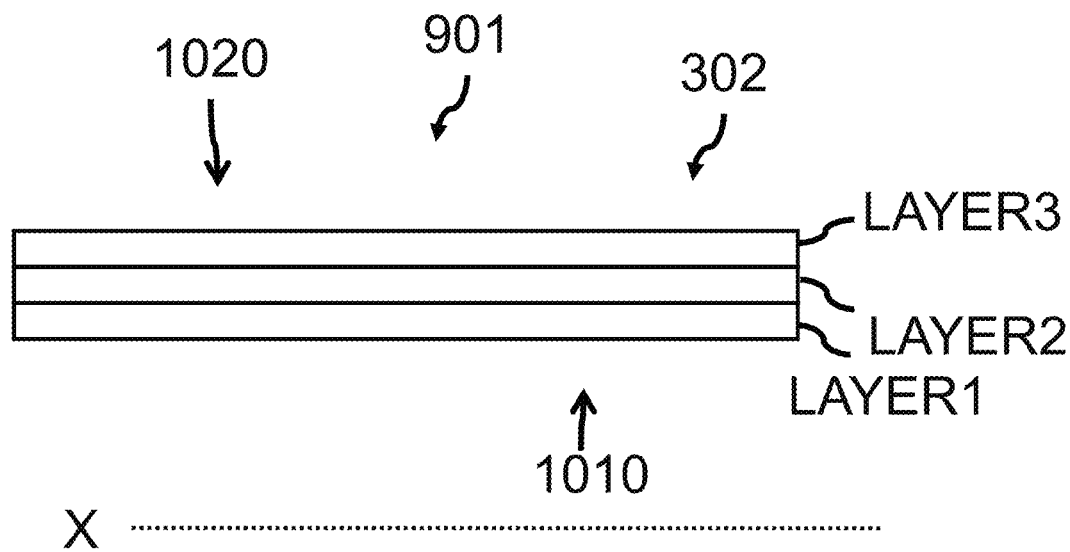
FIG. 8A illustrates a bonded length in a first portion of a conductor.
Figure 8B:
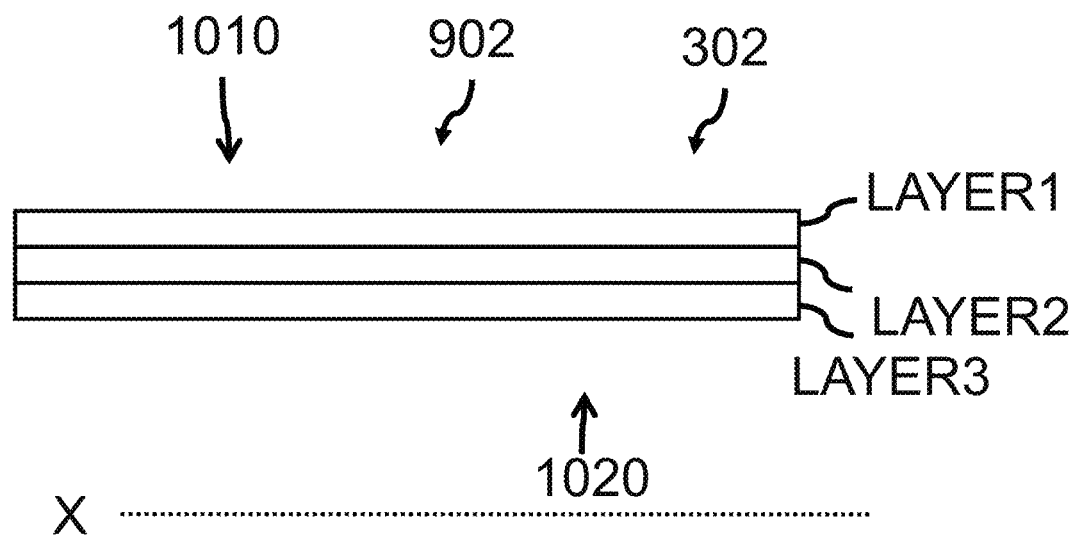
FIG. 8B illustrates a bonded length in a second portion of the conductor.
Figure 9:
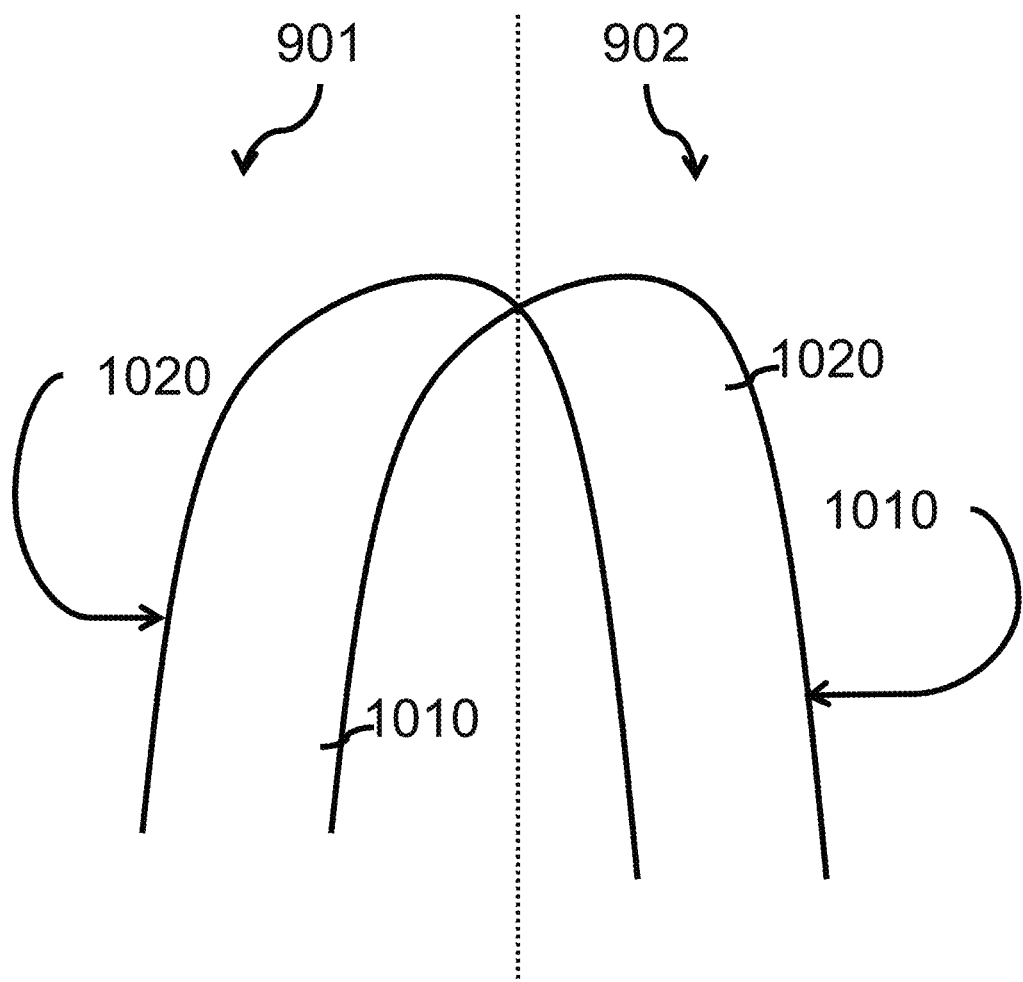
FIG. 9 illustrates a perspective view of a half-twist provided at a non-bonded portion of conductor.

FIG. 8A illustrates a bonded length 302 of the conductor 100 in the first portion of the conductor 100 and FIG. 8B a bonded length 302 of the conductor 100 in the second portion of the conductor 100. FIG. 9 illustrates a perspective view of a half-twist provided at a non-bonded portion of the conductor. In examples, the half-twist shown in FIG. 9 may be provided at a first or second axial end of a cylindrically-shaped conductor.

Providing the half-twist provides a first portion 901 of the conductor on a first side of the half-twist and a second portion 902 of the conductor on a second side of the half-twist.

The conductor has two faces, namely a first face 1010 and a second face 1020. The two faces define opposing sides of the conductor. In the first portion 901 of the conductor the first face 1010 of the conductor faces toward a given direction (e.g. in the direction of the perspective view in FIG. 9) and the second face 1020 of the conductor faces away from the given direction (e.g. away from the direction of the perspective view in FIG. 9). In the second portion 902 of the conductor the second face 1020 of the conductor faces toward a given direction (e.g. in the direction of the perspective view in FIG. 9) and the first face 1010 of the conductor faces away from the given direction (e.g. away from the direction of the perspective view in FIG. 9).

A given loop may form the first face and another loop may form the second face. Therefore, the half-twist changes which loop faces in (e.g. which loop is closest to) a given direction. When a cylindrically-shaped conductor is formed with the conductor comprising a half-twist, the first face 1010 faces the central longitudinal axis for a first portion 901 of the conductor and a second face 1020 faces the central longitudinal axis for a second portion 902 of the conductor.

The bonded length 302 in FIG. 8A is representative of all of the bonded lengths 302 in the first portion 901 of the first conductor 100. The bonded length 302 in FIG. 8B is representative of all of the bonded lengths 302 in the second portion 902 of the conductor 100.

In the first portion 901 bonded lengths 302 are arranged so that: the first layer LAYER1 is disposed closer to the central longitudinal axis X than the second layer LAYER2, third layer LAYER3 and so on up to the fifteenth layer.

In the second portion 902 of the bonded lengths 302 are arranged so that: the fifteenth layer (not shown) is the closest layer to the central longitudinal axis, next the fourteenth layer (not shown) and so on. The third layer LAYER 3 is disposed closer to the central longitudinal axis X than the second layer LAYER 2, and first layer LAYER 1; the second layer LAYER 2 is disposed closer to the central longitudinal axis X than the first layer LAYER 1.

When a current is flowed through the conductor in use, loops closer to the central longitudinal axis X heat up to greater temperatures in comparison to the loops which are further from the central longitudinal axis X. Providing the half-twist changes the order in which the loops in the conductor are disposed relative to the central longitudinal axis and therefore may regulate the temperature of the conductor and avoid damage caused by said heat.

Preferably the half-twist is disposed at a midpoint of the conductor i.e. at a point of the conductor equidistant between electrical connection terminals of the conductor. Advantageously, providing the half-twist at a midpoint of the conductor may result in equal amounts of heating of loops in the first region 901 on the first side of the half-twist and the second region 902 on the second side of the half-twist, and therefore, wear incurred by heating the conductor is evenly distributed over the first region 901 and the second region 902. It will be appreciated that the above description of the half-twist respect to FIGS. 8A, 8B and 9 can be generalised to any number of wires (or layers of wires) which form the conductor.

It will be appreciated that the half-twist described above is applied to the first folded conductor 400, the second folded conductor 400', and the third folded conductor 400".

A method of manufacturing a stator for a slotless electric motor comprises a step of rotating each petal about a point on the second circle to align in parallel the bonded lengths of all of the petals to thereby provide a stator comprising a cylindrically-shaped conductor having a diameter equal to the second diameter and wherein the bonded lengths are equidistantly disposed around and from a central longitudinal axis of the cylindrically-shaped conductor.

FIG. 11 illustrates a cylindrically-shaped conductor formed from the stack of conductors 500 shown in FIGS. 7A and 7B after implementing the above recited method step.

FIGS. 10A, 10B, and 10C illustrate a sequence of steps to rotate the set of petals 510 of the folded conductor shown in FIG. 7A to form the stator core illustrated in FIG. 11; FIG. 11 illustrates a radial perspective view of a cylindrically-shaped conductor 1100 formed from the stack of conductor 500 shown in FIGS. 7A and 7B.

All of the petals (i.e. all of the petals in the sets of petals) 610 620 are rotated around about a point on the second circle 552, that is, the point on the second circle 552 which is the closest to a given set of petal 610 620. The end of each petal 410 420 410' 420' 410" 420" (in a set of petals 610 620) which is closest to the first circle 551 is rotated toward the central longitudinal axis X.

As shown in FIG. 10B, all of the petals in a set of petals 610 620 are rotated in the same direction i.e. each of the first ends of the petals are rotated on a particular side of the plane containing the first circle 551 and second circle 552 (e.g. all of the first ends are rotated over a 'top' side of the plane).

As shown in FIG. 10C, each petal in a set of petals 610 620 is rotated through 90° so that the length of each bonded length 302 302' 302" in each petal is perpendicular to the plane containing the first circle 551 and the second circle 552.

All of the bonded lengths 302 302' 302" of the set of conductors 500 are disposed on the second circle 552.

The method may also comprise a step of bending a first axial end of the cylindrically-shaped conductor to toward the longitudinal axis.

FIG. 11 illustrates a cylindrically-shaped conductor 1100 formed from the set of conductors 500. The cylindrically-shaped conductor 1100 has a first axial end 1110 and a second axial end 1120. A flux ring 1105 is disposed around the cylindrically-shaped conductor 1100.

The conductors 400 400' 400" which form the cylindrically-shaped conductor 1100 are connected to a source of emf via respective connections 120 120' 120" (see FIGS. 4A, 4B, 5A, 5B, 6A and 6B). The connections are connected to a source of emf via a star connection.

The non-bonded lengths on the first axial end 1110 are bent towards the central longitudinal axis X to thereby reduce the mean distance of all points on the non-bonded lengths from the longitudinal axis X. Advantageously, this reduces the mean distance of all points on the non-bonded lengths from the first axial side 1110 concentrates the magnetic field (e.g. the field lines are comparatively more closely spaced to the central longitudinal axis) when current flows through the conductor, thereby comparatively increasing the power transfer between the stator and a rotor disposed around the cylindrical-shaped conductor (i.e. operated as a stator) in use. Advantageously, power losses ($I^2R$) are reduced which may lead to a lower temperature rise in the conductor when a current is flowed therethrough. Reducing the temperature rise in the conductor permits a greater torque to be applied to the motor (and higher motor speeds obtained).

The cylindrically-shaped conductor 1100 is operable as a three phase stator for a motor. The first conductor 400 is configured to carry a first phase. The second conductor 400' is configured to carry a second phase (e.g. an AC current with a phase lag of 120 degrees relative to the AC current applied to the first conductor). The third conductor 400" is configured to carry a third phase (e.g. an AC current with a phase lag of 240 degrees relative to the AC current applied to the first conductor).

FIG. 13 illustrates a flowchart depicting a method of manufacturing a stator for a slotless electric motor.

The method of manufacturing a stator for a slotless electric motor the method comprising:

Disposing, S802, a conductor in the shape of an annular cylinder, the annular cylinder having an inner radial face and an outer radial face and first axial face and a second axial face, and wherein the conductor comprises a bundle of wires wherein: each wire is disposed parallel to the other wires and, each wire is disposed a constant distance from the inner radial face;

In other words, a conductor comprising a plurality of loops is disposed into an annular shape as illustrated in FIGS. 2A and 2B and as described above.

Bonding, S804, a plurality of bonded lengths on the conductor wherein the bonded lengths comprise regions of the conductor wherein adjacent wires (i.e. adjacent layers of wires) are bonded along the bonded lengths and wherein the average spacing between adjacent wires is smaller in the bonded lengths than in non-bonded lengths, wherein the plurality of bonded lengths are separated by non-bonded lengths.

In other words, portions of the conductor are bonded to thereby provide a conductor as illustrated in FIGS. 3A to 3C and as described above.

The step of bonding a plurality of bonded lengths on the conductor comprises: applying a bonding compound to lengths of the conductor; and, activating the bonding compound to thereby form a plurality of bonded lengths.

As described herein the bonding compound may be an adhesive such as a resin. For example, the bounding compound may be a resin such as a heat-activated resin. The requisite heat may be supplied by at least one of: heating with a clamping member; Joule heating of the conductor; irradiation with infrared light.

The step of bonding a plurality of bonded lengths may also comprise applying a clamping force (e.g. by a clamping member) the length of the conductor where the bonding compound (e.g. resin) is applied to thereby reduce the average spacing between the wires of the conductor at the length of the conductor where the bonding compound is applied. When the bonding compound is activated and sets then the clamping force can be removed.

Optionally, applying, S805, a half-twist to one of the non-bonded lengths of the conductor at a first point on the conductor so that a cross-section of the wire at the first point of the conductor is a mirror-image of a cross-section of the wire at a second point of the conductor, such that, a wire on the inner radial face at the first point is on the outer radial face at the second point.

A half-twist and its purpose are described in more detail above.

Folding, S806, the conductor to provide a plurality of petals repeated along the conductor, wherein each petal comprises a pair of bonded lengths connected by a non-bonded length, wherein the pair of bonded lengths are disposed parallel to each other, and wherein: adjacent petals on the conductor are connected by a non-bonded length; and, the non-bonded lengths in the petals are bounded by a circumference of a first circle, wherein the first circle has a first diameter; the non-bonded lengths which connect the petals are bounded by a circumference of a second circle, wherein the second circle has a second diameter, wherein the second diameter is less than the first diameter, and wherein the first circle and second circle are coplanar and concentric.

In other words, petals are provided in the conductor to provide a conductor as illustrated in FIG. 4B and as described above.

Optionally repeating steps S802 to S806 to provide a plurality of folded conductors and axially stacking the plurality of folded conductors.

Rotating, S808, each petal about a point on the second circle to align in parallel the bonded lengths of all of the petals to thereby provide a stator comprising a cylindrically-shaped conductor having a diameter equal to the second diameter and wherein the bonded lengths are equidistantly disposed around and from a central longitudinal axis of the cylindrically-shaped conductor.

In other words, each petal is rotated in the manner illustrated in the sequence of FIGS. 10A to 10C to provide a cylindrically shaped conductor as illustrated in FIG. 11.

Bending, S809, a first axial end of the cylindrically-shaped conductor to toward the longitudinal axis.

Disposing, S810, the cylindrically-shaped conductor within a central hole of a flux ring having an inner diameter which is greater than the second diameter to thereby provide a stator comprising a cylindrically-shaped conductor with a flux ring disposed around an outer radial surface of the conductor.

In examples, the flux ring has an axial length which is less than or equal to the length of the bonded lengths of the conductor. Disadvantageously, in examples wherein the flux ring is longer than the bonded lengths the wires may become lose (e.g. the average spacing of the wires in the bonded lengths might increase).

Disposing, S812, an expandable mandrel in the centre of the cylindrically-shaped conductor; and, expanding, the expandable mandrel when the cylindrically-shaped conductor is disposed within the central hole of the flux ring to thereby increase the diameter of the cylindrically-shaped conductor to a diameter between the second diameter and the inner diameter of the flux ring.

Advantageously, the radial distance between the cylindrically-shaped conductor and the flux distance is minimised.

Bending, S814, a second axial end of cylindrically-shaped conductor away from the longitudinal axis.

The non-bonded lengths 301 at the second axial end 302 flare out to thereby reduce the mean axial distance between the non-bonded lengths and the flux ring.

Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

To perform the step of disposing a conductor in the shape of an annular cylinder, the annular cylinder having an inner radial face and an outer radial face and first axial face and a second axial face, and wherein the conductor comprises a bundle of wires wherein: each wire is disposed parallel to the other wires and, each wire is disposed a constant distance from the inner radial face, an alternative to winding the conductor in the manner of a helix around a central longitudinal axis is to instead wind the conductor in the manner of a spiral around the central longitudinal axis to thereby form the conductor into a cylindrical shape. In such examples, each wire is disposed at a constant distance from an axial face of the cylindrical shape.

This specification is embodied by the following numbered paragraphs:

Numbered Paragraph 1. A method of manufacturing a stator for a slotless electric motor, the method comprising:
  disposing a conductor in the shape of an annular cylinder;
  bonding a plurality of bonded lengths of the conductor wherein the bonded lengths comprise regions of the conductor wherein adjacent wires are bonded along the bonded lengths and wherein the average spacing between adjacent wires is smaller in the bonded lengths than in non-bonded lengths, wherein the plurality of bonded lengths are separated by non-bonded lengths;
  folding the conductor to provide a plurality of petals repeated along the conductor, wherein each petal comprises a pair of bonded lengths connected by a non-bonded length, wherein the pair of bonded lengths are disposed parallel to each other, and wherein:
    adjacent petals on the conductor are connected by a non-bonded length; and,
    the non-bonded lengths in the petals are bounded by a circumference of a first circle, wherein the first circle has a first diameter;
    the non-bonded lengths which connect the petals are bounded by a circumference of a second circle, wherein the second circle has a second diameter, wherein the second diameter is less than the first diameter, and wherein the first circle and second circle are coplanar and concentric;
  rotating each petal about a point on the second circle to align in parallel the bonded lengths of all of the petals to thereby provide the stator comprising a cylindrically-shaped conductor having a diameter equal to the second diameter and wherein the bonded lengths are equidistantly disposed around and from a central longitudinal axis of the cylindrically-shaped conductor.

Numbered Paragraph 2. The method of Numbered Paragraph 1, wherein:
  the step of bonding a plurality of bonded lengths on the conductor comprises:
    applying a bonding compound to lengths of the conductor to thereby form a plurality of bonded lengths.

Numbered Paragraph 3. The method of Numbered Paragraph 2, wherein:
  the step of bonding a plurality of bonded lengths on the conductor further comprises activating the bonding compound.

Numbered Paragraph 4. The method of any of the preceding Numbered Paragraphs, comprising:
  applying a half-twist to one of the non-bonded lengths of the conductor at a first point on the conductor so that a cross-section of the wire at the first point of the conductor is a mirror-image of a cross-section of the wire at a second point of the conductor, such that, a wire on the inner radial face at the first point is on the outer radial face at the second point.

Numbered Paragraph 5. The method of any of the preceding Numbered Paragraphs, comprising:
  disposing the cylindrically-shaped conductor within a central hole of a flux ring having an inner diameter which is greater than the second diameter to thereby provide a stator comprising a cylindrically-shaped conductor with a flux ring disposed around an outer radial surface of the conductor.

Numbered Paragraph 6. The method of Numbered Paragraph 5, wherein:
  the flux ring has an axial length which is at least the length of the bonded lengths of the conductor.

Numbered Paragraph 7. The method of any of the preceding Numbered Paragraphs, the method comprising:
  disposing an expandable mandrel in the centre of the cylindrically-shaped conductor; and,
  expanding the expandable mandrel when the cylindrically-shaped conductor is disposed within the central hole of the flux ring to thereby increase the diameter of the cylindrically-shaped conductor to a diameter between the second diameter and the inner diameter of the flux ring.

Numbered Paragraph 8. The method of any the preceding Numbered Paragraphs, comprising;
  bending a first axial end of the cylindrically-shaped conductor to toward the longitudinal axis.

Numbered Paragraph 9. The method of any the preceding Numbered Paragraphs, comprising;
  bending a second axial end of cylindrically-shaped conductor away from the longitudinal axis.

Numbered Paragraph 10. A method of manufacturing stator for a slotless electric motor, the method comprising:
  disposing a conductor in a penannular shape within the bounds of an annular cylinder having an inner radial face and an outer radial face and first axial face and a second axial face
  bonding a plurality of bonded lengths on the conductor wherein the bonded lengths comprise regions of the conductor wherein the wires in the region have been bonded together, wherein the plurality of bonded lengths are separated by non-bonded lengths;
  applying a half-twist to one of the non-bonded lengths of the conductor at a first point on the conductor so that a cross-section of the wire at the first point of the conductor is a mirror-image of a cross-section of the wire at a second point of the conductor, such that, a wire on the inner radial face at the first point is on the outer radial face at the second point.

Numbered Paragraph 11. A stator for a slotless electric motor obtainable by the method of any of Numbered Paragraphs 1 to 10.

Numbered Paragraph 12. A method of manufacturing a slotless electric motor, the method comprising:
  performing the method of any of Numbered Paragraphs 1 to 11 to provide a stator;
  providing a rotor configured to rotate around an axial centre of the stator.

Numbered Paragraph 13. A stator for a slotless electric motor, the stator comprising:
  a conductor comprising a bundle of wires wherein each wire is disposed parallel to the other wires wherein the conductor comprises a plurality of bonded lengths wherein the bonded lengths comprise regions of the conductor wherein adjacent wires are bonded along the bonded lengths and wherein the average spacing between adjacent wires is smaller in the bonded lengths than in non-bonded lengths, wherein the non-bonded lengths separate the plurality of bonded lengths.

Numbered Paragraph 14. The stator of Numbered Paragraph 13, wherein:
the conductor is disposed in a cylindrical shape, wherein:
the bonded lengths of the conductor are arranged parallel to each other and are disposed on the circumference of a circle; and,
the bonded lengths are equidistantly disposed around and from a central longitudinal axis of the cylindrically-shaped conductor.

The invention claimed is:

1. A method of manufacturing a stator for a slotless electric motor, the method comprising:
disposing a conductor in the shape of an annular cylinder;
bonding a plurality of bonded lengths of the conductor wherein the bonded lengths comprise regions of the conductor wherein adjacent wires are bonded along the bonded lengths and wherein the average spacing between adjacent wires is smaller in the bonded lengths than in non-bonded lengths, wherein the plurality of bonded lengths are separated by non-bonded lengths;
folding the conductor to provide a plurality of petals repeated along the conductor, wherein each petal comprises a pair of bonded lengths connected by a non-bonded length, wherein the pair of bonded lengths are disposed parallel to each other, and wherein:
adjacent petals on the conductor are connected by a non-bonded length; and,
the non-bonded lengths in the petals are bounded by a circumference of a first circle, wherein the first circle has a first diameter;
the non-bonded lengths which connect the petals are bounded by a circumference of a second circle, wherein the second circle has a second diameter, wherein the second diameter is less than the first diameter, and wherein the first circle and second circle are coplanar and concentric;
rotating each petal about a point on the second circle to align in parallel the bonded lengths of all of the petals to thereby provide the stator comprising a cylindrically-shaped conductor having a diameter equal to the second diameter and wherein the bonded lengths are equidistantly disposed around and from a central longitudinal axis of the cylindrically-shaped conductor.

2. The method of claim 1, wherein:
the step of bonding a plurality of bonded lengths on the conductor comprises:
applying a bonding compound to lengths of the conductor to thereby form a plurality of bonded lengths.

3. The method of claim 2, wherein:
the step of bonding a plurality of bonded lengths on the conductor further comprises activating the bonding compound.

4. The method of claim 1, comprising:
applying a half-twist to one of the non-bonded lengths of the conductor at a first point on the conductor so that a cross-section of the wire at the first point of the conductor is a mirror-image of a cross-section of the wire at a second point of the conductor, such that, a wire on the inner radial face at the first point is on the outer radial face at the second point.

5. The method of claim 1, comprising:
disposing the cylindrically-shaped conductor within a central hole of a flux ring having an inner diameter which is greater than the second diameter to thereby provide a stator comprising a cylindrically-shaped conductor with a flux ring disposed around an outer radial surface of the conductor.

6. The method of claim 5, wherein:
the flux ring has an axial length which is at least the length of the bonded lengths of the conductor.

7. The method of claim 5, the method comprising:
disposing an expandable mandrel in the centre of the cylindrically-shaped conductor; and,
expanding the expandable mandrel when the cylindrically-shaped conductor is disposed within the central hole of the flux ring to thereby increase the diameter of the cylindrically-shaped conductor to a diameter between the second diameter and the inner diameter of the flux ring.

8. The method of claim 1, comprising;
bending a first axial end of the cylindrically-shaped conductor to toward the longitudinal axis.

9. The method of claim 1, comprising;
bending a second axial end of cylindrically-shaped conductor away from the longitudinal axis.

10. A stator for a slotless electric motor obtainable by the method of claim 1.

11. A method of manufacturing a slotless electric motor, the method comprising:
performing the method of claim 1 to provide a stator;
providing a rotor configured to rotate around an axial centre of the stator.

* * * * *